(12) United States Patent
Levola

(10) Patent No.: US 7,206,107 B2
(45) Date of Patent: Apr. 17, 2007

(54) METHOD AND SYSTEM FOR BEAM EXPANSION IN A DISPLAY DEVICE

(75) Inventor: Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 302 days.

(21) Appl. No.: 11/011,480

(22) Filed: Dec. 13, 2004

(65) Prior Publication Data

US 2006/0126179 A1   Jun. 15, 2006

(51) Int. Cl.
*G03H 1/00*   (2006.01)
(52) U.S. Cl. .................. 359/34; 359/566; 359/568; 359/576; 359/15
(58) Field of Classification Search ........ 359/566–576, 359/34, 15, 563
See application file for complete search history.

(56) References Cited

U.S. PATENT DOCUMENTS

| | | | |
|---|---|---|---|
| 4,946,253 A | 8/1990 | Kostuck | 350/169 |
| 5,724,163 A | 3/1998 | David | 359/15 |
| 5,966,223 A | 10/1999 | Friesem et al. | 359/16 |
| 6,185,015 B1 | 2/2001 | Reinhorn et al. | 359/15 |
| 6,580,529 B1 | 6/2003 | Amitai et al. | 359/13 |
| 6,805,490 B2 * | 10/2004 | Levola | 385/67 |
| 2003/0067685 A1 | 4/2003 | Niv | 359/566 |
| 2004/0174348 A1 * | 9/2004 | David | 345/204 |
| 2004/0233534 A1 | 11/2004 | Nakanishi et al. | 359/572 |

FOREIGN PATENT DOCUMENTS

| | | |
|---|---|---|
| EP | 0386643 | 9/1990 |
| EP | 1215522 | 6/2002 |
| WO | WO 99/52002 | 10/1999 |
| WO | WO 2004/109349 | * 12/2004 |

* cited by examiner

*Primary Examiner*—Leonidas Boutsikaris
(74) *Attorney, Agent, or Firm*—Ware, Fressola, Van Der Sluys & Adolphson LLP

(57) ABSTRACT

An exit pupil extender wherein the relative amount of different color components in the exit beam is more consistent with that of the input beam. In order to compensate for the uneven amount in the diffracted color components in the exit beam, the exit pupil extender, comprises a plurality of layers having additional diffraction gratings so as to increase the amount of diffracted light for those color components with a lower amount. Additionally, color filters disposed between layers to reduce the diffracted light components with a higher amount.

28 Claims, 5 Drawing Sheets

METHOD AND SYSTEM FOR BEAM EXPANSION IN A DISPLAY DEVICE

FIELD OF THE INVENTION

The present invention relates generally to a display device and, more specifically, to a display that uses one or more diffractive elements for extending the exit pupil of the display for viewing.

BACKGROUND OF THE INVENTION

While it is a common practice to use a low-resolution liquid-crystal display (LCD) panel to display network information and text messages in a mobile device, it is preferred to use a high-resolution display to browse rich information content of text and images. A microdisplay-based system can provide full color pixels at 50–100 lines per mm. Such high-resolution is generally suitable for a virtual display. A virtual display typically consists of a microdisplay to provide an image and an optical arrangement for manipulating light emerging from the image in such a way that it is perceived as large as a direct view display panel. A virtual display can be monocular or binocular.

The size of the beam of light emerging from imaging optics toward the eye is called exit pupil. In a Near-Eye Display (NED), the exit pupil is typically of the order of 10 mm in diameter. Further enlarging the exit pupil makes using the virtual display significantly easier, because the device can be put at a distance from the eye. Thus, such a display no longer qualifies as an NED, for obvious reasons. Head-Up Displays are an example of the virtual display with a sufficiently large exit pupil.

WO 99/52002 discloses a method of enlarging the exit pupil of a virtual display. The disclosed method uses three successive holographic optical elements (HOEs) to enlarge the exit pupil. In particular, the HOEs are diffractive grating elements arranged on a planar, light transmissive substrate 6, as shown in FIG. 1. As shown, light from an image source 2 is incident upon the first HOE, or H1, which is disposed on one side of the substrate 6. Light from H1, coupled to the substrate 6, is directed toward the second HOE, or H2, where the distribution of light is expanded in one direction. H2 also redirects the expanded light distribution to the third HOE, or H3, where the light distribution is further expanded in another direction. The holographic elements can be on any side of the substrate 6. H3 also redirects the expanded light distribution outward from the substrate surface on which H3 is disposed. The optical system, as shown in FIG. 1, operates as a beam-expanding device, which maintains the general direction of the light beam. Such a device is also referred to as an exit pupil extender (EPE).

The EPE, such as that shown in FIG. 1, results in color non-uniformity, thereby degrading the quality of the reproduced virtual image. The color non-uniformity is mainly due to the fact that light beams of different colors travel different paths in the substrate 6, as shown in FIG. 2. For illustration purposes, only two colors, represented by $\lambda_1$ and $\lambda_2$, are used to show the source of color non-uniformity in the prior art EPE, with $\lambda_1 < \lambda_2$.

In FIG. 2, only two HOEs are used, but the source of color non-uniformity is the same when three or more HOEs are used. The first HOE, or H1, typically has a diffractive structure consisting of parallel diffractive fringes for coupling incident light into the substrate 6 and directing the light distribution within the substrate 6 toward the second HOE, or H2. The substrate 6 acts as a light guide to trap the light beams between its two surfaces mainly by means of total internal reflection (TIR). As shown in FIG. 2, the diffractive elements H1 and H2 are both disposed on the lower surface of the substrate 6. In such an optical device, TIR is complete only at the upper surface, because part of the light is diffracted out from the lower surface of the substrate toward the viewer's eye.

It is known that the diffraction angle inside the substrate 6 is governed by:

$$\sin(\theta_i) - n\sin(\theta_m) = m\lambda/d$$

where
  d is the grating period of the diffractive element (here H1)
  $\lambda$ is the wavelength
  n is the refractive index of the substrate
  m is the diffraction order
  $\theta_i$ is the angle of incident, and
  $\theta_m$ is the angle of diffraction in $m^{th}$ order.

As can be seen from Equation 1, the diffraction angle $\theta_m$ increases with wavelength $\lambda$. Thus, the diffraction angle $\theta_{m1}$ is smaller than the diffraction angle $\theta_{m2}$. As a result, the interval L between two successive TIRs also varies with wavelength. The interval $L_1$ for $\lambda_1$ is smaller than the interval $L_2$ for $\lambda_2$. Thus, the distribution of outgoing light in the $\eta$ direction is not uniform for all wavelengths, although the grating structure can be designed so that the output is homogeneous for one wavelength. As can be seen in FIG. 2, the shorter wavelength $\lambda_1$ experiences more "hits" than and $\lambda_2$ on the diffractive elements H2. Consequently, more light of the shorter wavelength $\lambda_1$ "leaks" out of the diffractive element H2 in the area near H1. In a display where three primary colors (red, green, blue) are used, an EPE of FIG. 2 will cause an uneven color distribution of the light exiting the diffractive grating structure of H2. Thus, the color may appear bluish on the near end and reddish on the far end, relative to H1. As the distance along the $\eta$ direction increases, the uneven color distribution becomes more noticeable.

It should be noted that light can "leak" out of the substrate 6 from the lower surface where H2 is located or from the upper surface. The distribution of outgoing light from the upper surface is similar to that from the lower surface.

It is advantageous and desirable to provide a method and system for improving the color uniformity in light distribution in an exit pupil extender.

SUMMARY OF THE INVENTION

It is an objective to the present invention to provide an exit pupil extender wherein the relative amount of different color components in the exit beam is more consistent with that of the input beam. In order to compensate for the uneven amount in the diffracted color components in the exit beam, the exit pupil extender, according to the present invention, comprises a plurality of layers having additional diffraction gratings so as to increase the amount of diffracted light for those color components with a lower amount.

Thus, the first aspect of the present invention provides an optical device comprising:
  an exit surface section;
  an input surface section to admit a light beam, the light beam comprising at least a first wavelength component and a second wavelength component; and
  at least a first layer and a second layer, each of the first and second layers comprising a first diffractive element and a second diffractive element, such that at least a part of the admitted light beam is diffracted in the first diffractive element in the first layer for providing a first diffracted portion;

at least a part of the admitted light beam is diffracted in the first diffractive element in the second layer for providing a second diffracted portion;

at least a part of the first diffracted portion is further diffracted in the second diffractive element in the first layer, thereby forming a first part of an exit beam exiting through the exit surface section; and at least a part of the second diffracted portion is further diffracted in the second diffractive element in the second layer, thereby forming a second part of the exit beam exiting through the exit surface section.

According to the present invention, the amount of the first wavelength component in the first part of the exit beam is greater than the amount of the second wavelength component in the first part of the exit beam, and the amount of the second wavelength component in the second part of the exit beam is greater than the amount of the first wavelength component in the second part of the exit beam.

According to the present invention, the admitted light beam further comprises a third wavelength component and said optical device further comprises:

a third layer comprising a first diffractive element and a second diffractive element, such that at least a part of the admitted light beam is diffracted in the first diffractive element in the third layer for providing a third diffracted portion, and at least a part of the third diffracted portion is further diffracted in the second diffractive element in the third layer, thereby forming a third part of the exit beam exiting through the exit surface section.

According to the present invention, the amount of the first wavelength component in the first part of the exit beam is greater than the amount of the second wavelength component in the first part of the exit beam and is also greater than the amount of the third wavelength component in the first part of the exit beam;

the amount of the second wavelength component in the second part of the exit beam is greater than the amount of the first wavelength component in the second part of the exit beam and is also greater than the amount of the third wavelength component in the second part of the exit beam; and the amount of the third wavelength component in the third part of the exit beam is greater than the amount of the first wavelength component in the third part of the exit beam and is also greater than the amount of the second wavelength component in the third part of the exit beam.

According to the present invention, the optical device further comprises a filter disposed between the first diffractive element in the first layer and the first diffractive element in the second layer so as to reduce the amount of the first wavelength component in the second part of the exit beam.

According to the present invention, the optical device further comprises another filter disposed between the first diffractive element of the second layer and the first diffractive element of the third layer so as to reduce the amount of the second wavelength component in the second part of the exit beam and the amount of the second wavelength component in the third part of the exit beam.

According to the present invention, the first and second diffractive elements in the first, second and third layers can be holographic optical elements or diffractive optical elements mechanically or chemically produced.

According to the present invention, the first wavelength component has a first wavelength range, the second wavelength component has a second wavelength range longer than the first wavelength range, and the third wavelength component has a third wavelength range greater than the second wavelength range.

According to the present invention, the first wavelength component comprises a blue color wavelength component, the second wavelength component comprises a green color component and the third wavelength component comprises a red color component.

The second aspect of the present invention provides a method of improving color uniformity in an exit beam in an optical device, the optical device having an input surface section to admit a light beam, the light beam comprising at least a first wavelength component and a second wavelength component; and an exit surface section for allowing the exit beam to exit the optical device through the exit surface. The method comprises:

providing at least a first layer, a second layer and a third layer in the optical device;

providing a first diffractive element and a second diffractive element in the first layer;

providing a first diffractive element and a second diffractive element in the second layer, providing a first diffractive element and a second diffractive element in the third layer, such that at least a part of the admitted light beam is diffracted in the first diffractive element in the first layer for providing a first diffracted portion;

at least a part of the admitted light beam is diffracted in the first diffractive element in the second layer for providing a second diffracted portion;

at least a part of the first diffracted portion is further diffracted in the second diffractive element in the first layer, thereby forming a first part of an exit beam exiting through the exit surface section; and at least a part of the second diffracted portion is further diffracted in the second diffractive element in the second layer, thereby forming a second part of the exit beam exiting through the exit surface section, wherein the amount of the first wavelength component in the first part of the exit beam is greater than the amount of the second wavelength component in the first part of the exit beam and is also greater than the amount of the third wavelength component in the first part of the exit beam;

the amount of the second wavelength component in the second part of the exit beam is greater than the amount of the first wavelength component in the second part of the exit beam and is also greater than the amount of the third wavelength component in the second part of the exit beam; and the amount of the third wavelength component in the third part of the exit beam is greater than the amount of the first wavelength component in the third part of the exit beam and is also greater than the amount of the second wavelength component in the third part of the exit beam.

According to the present invention, the method further comprises:

disposing a filter between the first diffractive element in the first layer and the first diffractive element in the second layer so as to reduce the amount of the first wavelength component in the second part of the exit beam and the amount of the first wavelength component in the third part of the exit beam;

disposing another filter between the first diffractive element of the second layer and the first diffractive element of the third layer so as to reduce the amount of the second wavelength component in the second part of the exit beam and the amount of the second wavelength component in the third part of the exit beam.

The third aspect of the present invention provides a display module, comprising:
- an optical engine for receiving image data;
- a display device operatively connected to the optical engine for forming an image based on the image data; and
- an exit pupil extender, comprising:
  - an exit surface section;
  - an input surface section to admit a light beam, the light beam comprising at least a first wavelength component and a second wavelength component; and
  - at least a first layer, a second layer and a third layer, each of the first, second and third layers comprises a first diffractive element and a second diffractive element, such that
  - at least a part of the admitted light beam is diffracted in the first diffractive element in the first layer for providing a first diffracted portion;
  - at least a part of the admitted light beam is diffracted in the first diffractive element in the second layer for providing a second diffracted portion;
  - at least a part of the admitted light beam is diffracted in the first diffractive element in the third layer for providing a third diffracted portion;
  - at least a part of the first diffracted portion is further diffracted in the second diffractive element in the first layer, thereby forming a first part of an exit beam exiting through the exit surface section;
  - at least a part of the second diffracted portion is further diffracted in the second diffractive element in the second layer, thereby forming a second part of the exit beam exiting through the exit surface section; and
  - at least a part of the third diffractive portion is further diffracted in the third diffractive element in the third layer, thereby forming a third part of the exit beam exiting through the exit surface section, wherein
  - the amount of the first wavelength component in the first part of the exit beam is greater than the amount of the second wavelength component in the first part of the exit beam and is also greater than the amount of the third wavelength component in the first part of the exit beam;
  - the amount of the second wavelength component in the second part of the exit beam is greater than the amount of the first wavelength component in the second part of the exit beam and is also greater than the amount of the third wavelength component in the second part of the exit beam; and
  - the amount of the third wavelength component in the third part of the exit beam is greater than the amount of the first wavelength component in the third part of the exit beam and is also greater than the amount of the second wavelength component in the third part of the exit beam.

The fourth aspect of the present invention provides an electronic device, comprising:
- a data processing unit;
- an optical engine operatively connected to the data processing unit for receiving image data from the data processing unit;
- a display device operatively connected to the optical engine for forming an image based on the image data; and
- an exit pupil extender, comprising:
  - an exit surface section;
  - an input surface section to admit a light beam, the light beam comprising at least a first wavelength component and a second wavelength component; and
  - at least a first layer, a second layer and a third layer, each of the first, second and third layers comprising a first diffractive element and a second diffractive element, such that
  - at least a part of the admitted light beam is diffracted in the first diffractive element in the first layer for providing a first diffracted portion;
  - at least a part of the admitted light beam is diffracted in the first diffractive element in the second layer for providing a second diffracted portion;
  - at least a part of the admitted light beam is diffracted in the first diffractive element in the third layer for providing a third diffracted portion;
  - at least a part of the first diffracted portion is further diffracted in the second diffractive element in the first layer, thereby forming a first part of an exit beam exiting through the exit surface section;
  - at least a part of the second diffracted portion is further diffracted in the second diffractive element in the second layer, thereby forming a second part of the exit beam exiting through the exit surface section; and
  - at least a part of the third diffracted portion is further diffracted in the third diffractive element in the third layer, thereby forming a third part of the exit beam exiting through the exit surface section, wherein
  - the amount of the first wavelength component in the first part of the exit beam is greater than the amount of the second wavelength component in the first part of the exit beam and is also greater than the amount of the third wavelength component in the first part of the exit beam;
  - the amount of the second wavelength component in the second part of the exit beam is greater than the amount of the first wavelength component in the second part of the exit beam and is also greater than the amount of the third wavelength component in the second part of the exit beam; and
  - the amount of the third wavelength component in the third part of the exit beam is greater than the amount of the first wavelength component in the third part of the exit beam and is also greater than the amount of the second wavelength component in the third part of the exit beam.

According to the present invention, the electronic device comprises a portable device, such as a mobile phone, personal digital assistant (PDA), communicator, portable Internet appliance, hand-held computer, digital video and still camera, wearable computer, computer game device, specialized bring-to-the-eye product for viewing and other portable electronic devices. However, the exit pupil extender can also be used in a non-portable device, such as a gaming device, vending machine, bank-o-mat, home appliance, such as an oven, microwave oven and other appliances, and other non-portable electronic devices.

The present invention will become apparent upon reading the description taken in conjunction with FIGS. 3a to 5.

BRIEF DESCRIPTION OF THE DRAWINGS

FIG. 4 is a schematic representation showing a different view of the exit pupil extender, according to the present invention.

BEST MODE TO CARRY OUT THE INVENTION

Figure 1:
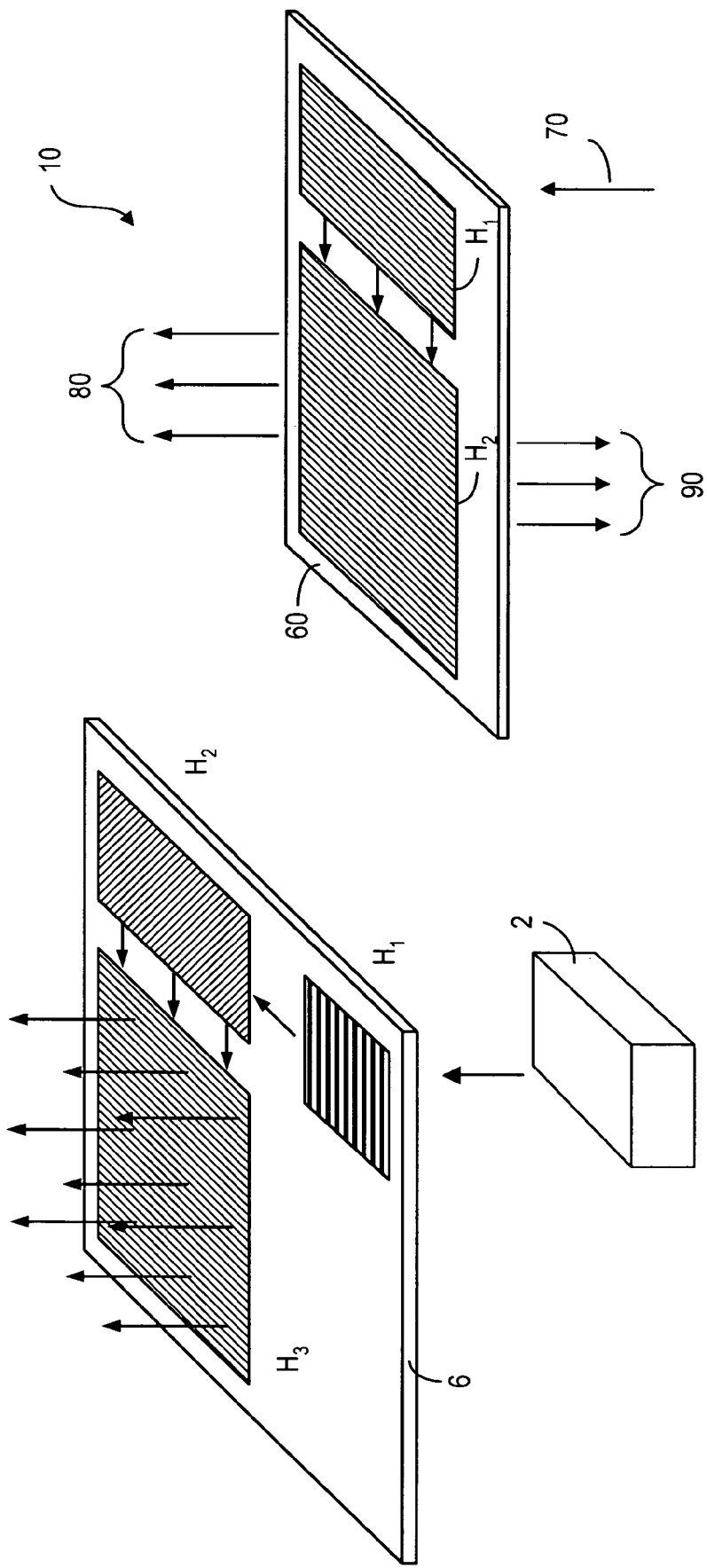
FIG. 1 is a schematic representation showing an exit pupil extender using three diffractive elements.
Figure 2:
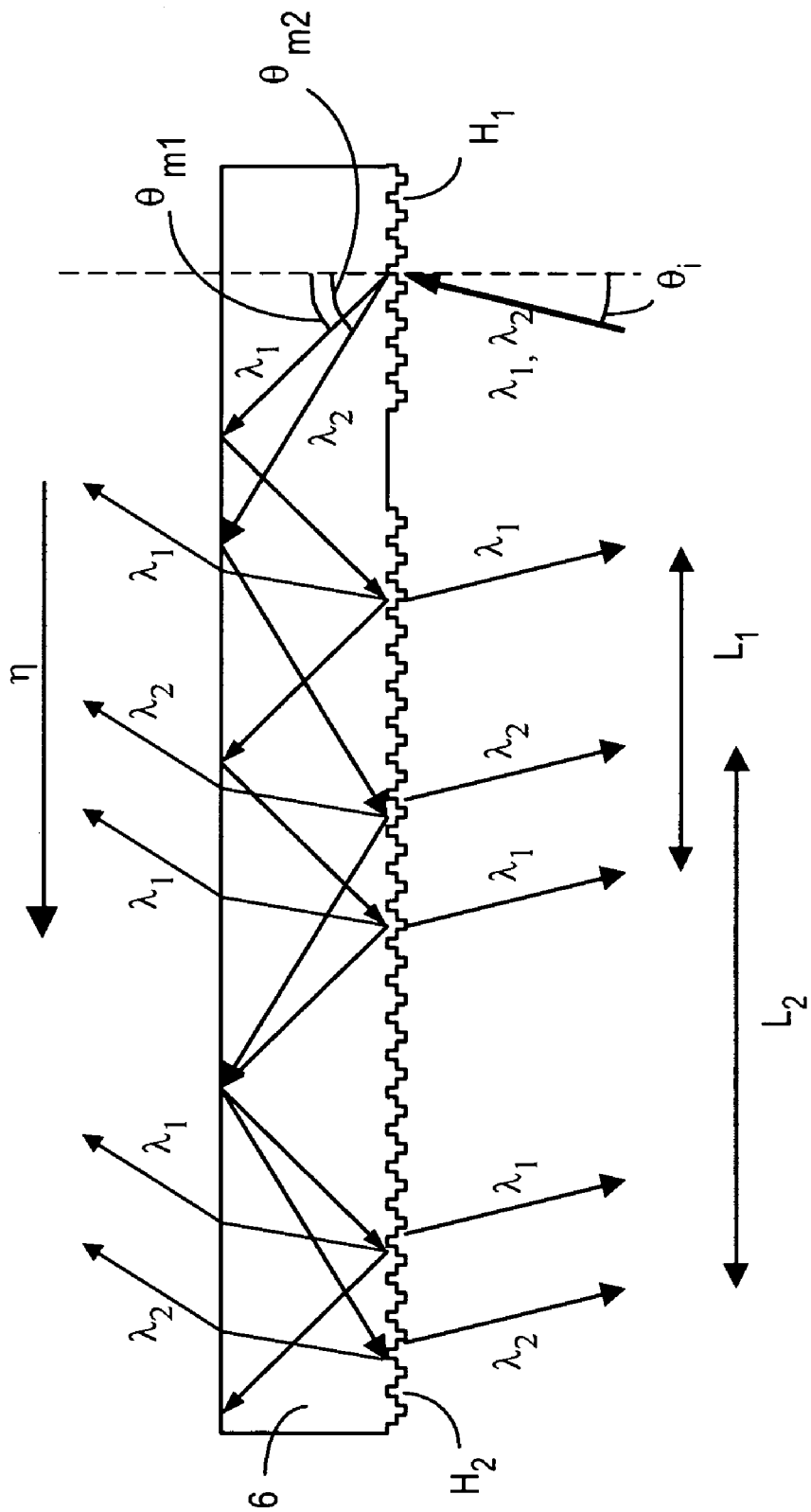
FIG. 2 is a schematic representation showing a prior art exit pupil extender.

Instead of using a homogeneous substrate 6, as shown in FIG. 2, the exit pupil extender (EPE) 10, of the present invention, uses a substrate 60 comprising a plurality of layers, each layer having a diffraction grating, as shown in FIGS. 3a–3d.

Figure 3A:
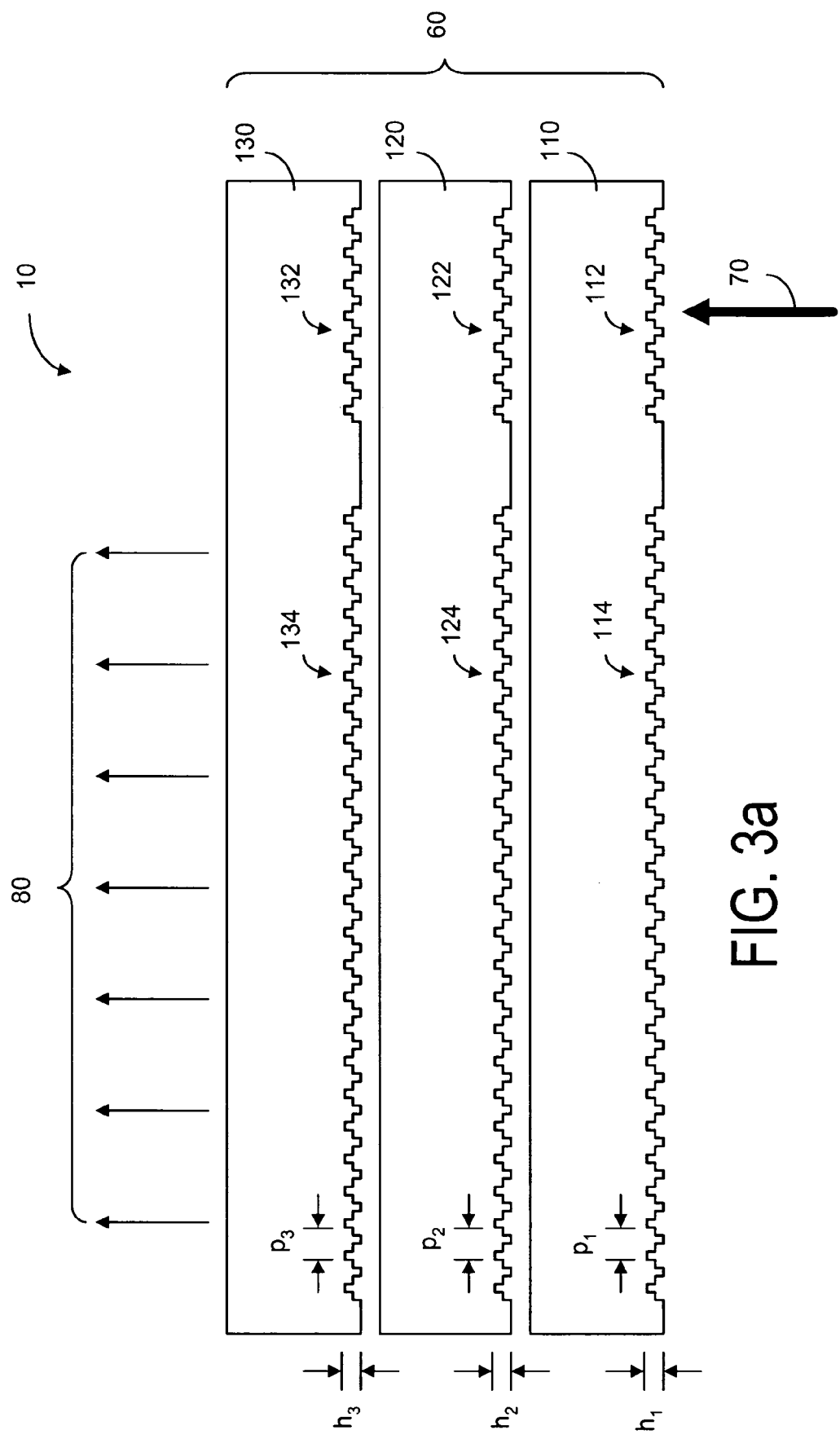
FIG. 3a is a schematic representation showing a part of the exit pupil extender, according to the present invention.

As shown in FIG. 3a, the substrate 60 has three layers of optical material 110, 120 and 130. The first layer 110 has an input diffraction grating 112 and an output diffraction grating 114. Likewise, the second layer 120 has an input diffraction grating 122 and an output diffraction grating 124, and the third layer 130 has an input diffraction grating 132 and an output diffraction grating 134. As shown in FIG. 3a, an incoming light beam 70 having red, green and blue components (RGB) enters the substrate 60 through the input grating 112 on the first layer 110. After being diffracted in gratings 112, 122 and 132, the light beam is broadened and exits through the upper surface of the third layer 130. The exit light beam is denoted by reference numeral 80. In order to achieve an exit beam in which the relative amount of color components is more consistent with that of the color components in the incoming beam, the grating period on the diffraction gratings on each layer is chosen differently. The grating period, p, is calculated partly based on the desirable field-of-view (FOV) of the beam expander as follows:

$$p = \lambda(1 + \sin(FOV/2))$$

Figure 3B:
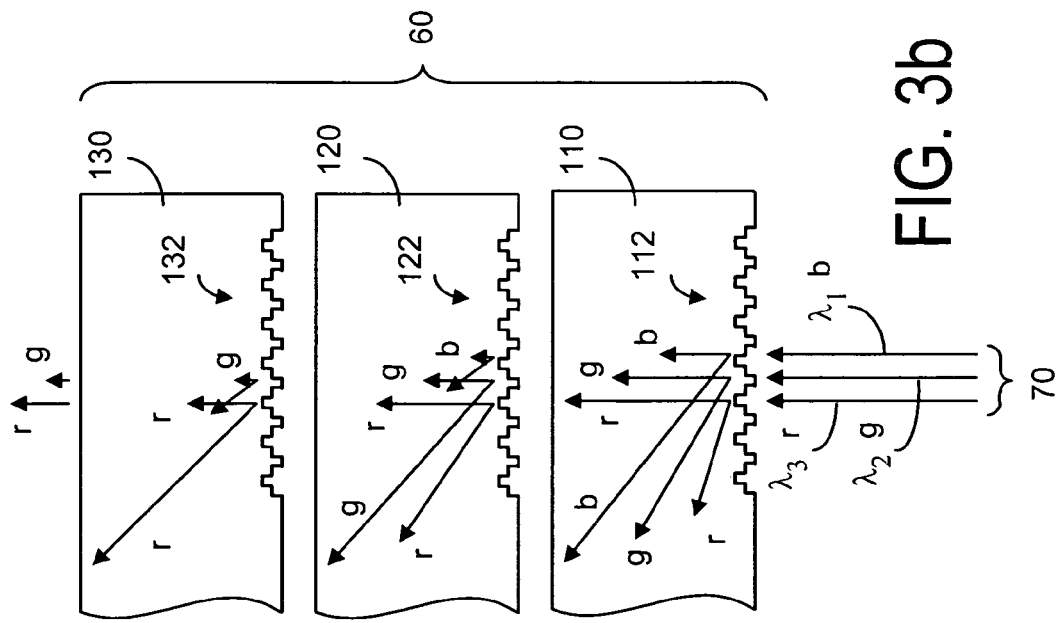
FIG. 3b is a schematic representation showing the diffraction of the input beam at various layers of the exit pupil extender, according to the present invention.

For example, if the FOV is 24 degrees and λ is 475 nm, then the period is 393 nm. According to the present invention, the period, $p_1$, of the grating pair (132, 134) is calculated based on the wavelength of the blue color component, or 475 mm. In order to allow the green color component to diffract more efficiently, the period, $p_2$, of the grating pair (122, 124) is calculated based on the wavelength of the green color component (525 nm) and $p_2$=435 nm. Likewise, the period $p_3$ of the grating pair and (112, 114) is calculated based on $\lambda_3$=630 nm, or $p_3$=522 nm. Due to the differences in the diffraction efficiency for different color components in different gratings, the amount of diffracted light for each color component in the each of the layers 110, 120 and 130 varies considerably. For example, in the first layer 110, the amount of the diffracted light for the blue color is greater than that for the green color, which is greater than that for the red color. As a result, when the reduced incoming light beam exits the upper surface of the first layer 110 and enters into the second layer 120, the remaining blue component is relatively insignificant. In the second layer 120, the diffraction efficiency for the green color component is greater than that for the red component. As a result, when the further reduced incoming light exits the upper surface of the second layer 120 and enters into the third layer 130, the remaining green component becomes relatively insignificant. Thus, the diffracted light in the third layer 130 is mainly of the red component. As shown in FIG. 3b, significant amount of diffracted light in red color occurs in all three layers 110, 120 and 130. Significant amount of diffracted light in green color occurs only in the first layer 110 and the second layer 120. However, in the first layer 100, the dominant diffracted color component is blue.

Figure 3C:
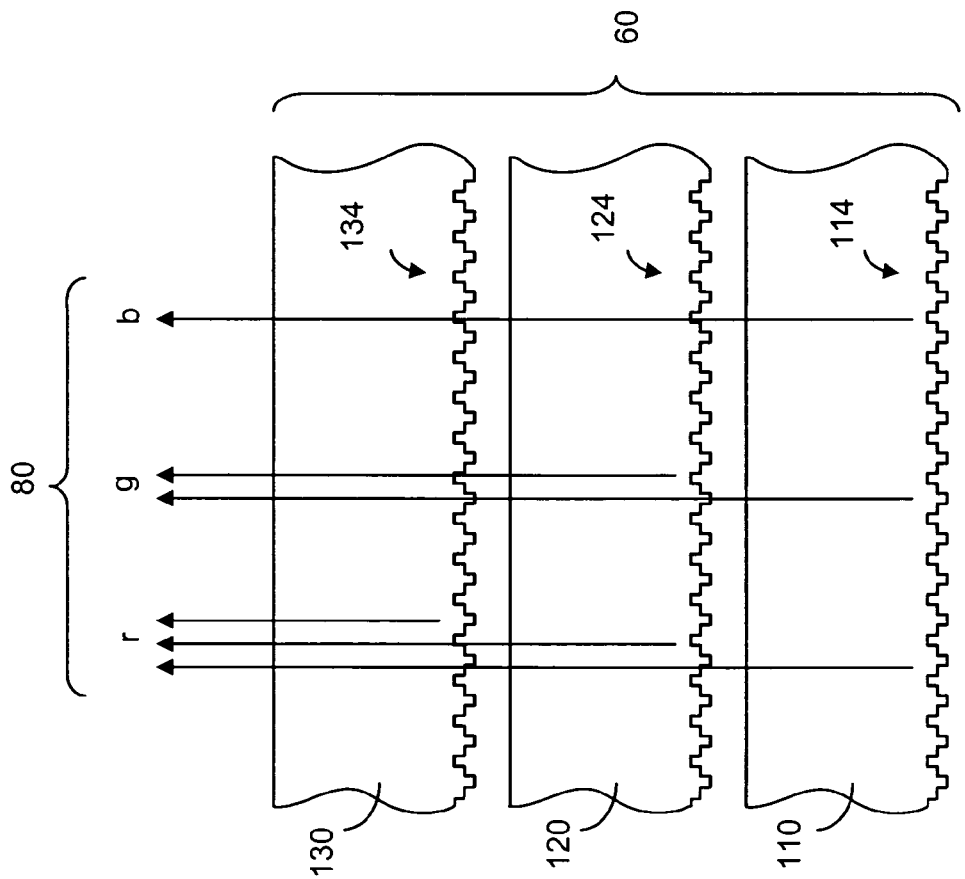
FIG. 3c is a schematic representation showing the composition of the color components in the exit beam.

After going through one or more internal total reflections at the upper surface of the layers and one or more diffraction processes at the diffraction gratings 134, 124, 114, the diffracted light exits the upper surface as a broad beam 80. As shown in FIG. 3c, the blue color component mainly comes from the first layer 110, while the green color component mainly comes from the first layer 110 and the second layer 120. The red color component comes from all three layers 110, 120 and 130.

In general, the relative amount of light in different color components in the exit beam is very different from that of the input beam. In order to compensate for the uneven distribution in color components in the exit beam in an exit pupil extender, additional diffraction gratings are used to increase the diffracted light amount in certain color components. Furthermore, the depth or height, h, of the diffraction grooves can be chosen in order to optimize the light coupling into the layers. The height, h, depends on the refractive index of the layers, the wavelength, the period, p, and the shape of the diffraction grooves.

It is possible to introduce color filters into the exit pupil extender 10 to adjust the color distribution in the exit beam 80. For example, it is possible to provide a yellow filter 140 between layer 120 and layer 110 to block the undiffracted blue color component from entering the second layer 120. Similarly, it is possible to provide a red filter 142 to block the undiffracted green color component and the residual undiffracted blue color component, if any, from entering the third layer 110. The filters 142 and 140 can be color coatings, for example.

The EPE 10, according to the present invention, has at least two diffractive elements H1, H2 arranged adjacent to each other so that the light distribution is expanded in one direction by H2. An exemplary arrangement of the diffractive elements H1 and H2 is shown in FIG. 4. It is possible to arrange the diffraction gratings 112, 114, 122, 124, 132 and 134 such that the exit beam exits the EPE 10 from a different direction. Thus, with the same input beam 70, it is possible to have an exit beam 80 or an exit beam 90.

Figure 5:
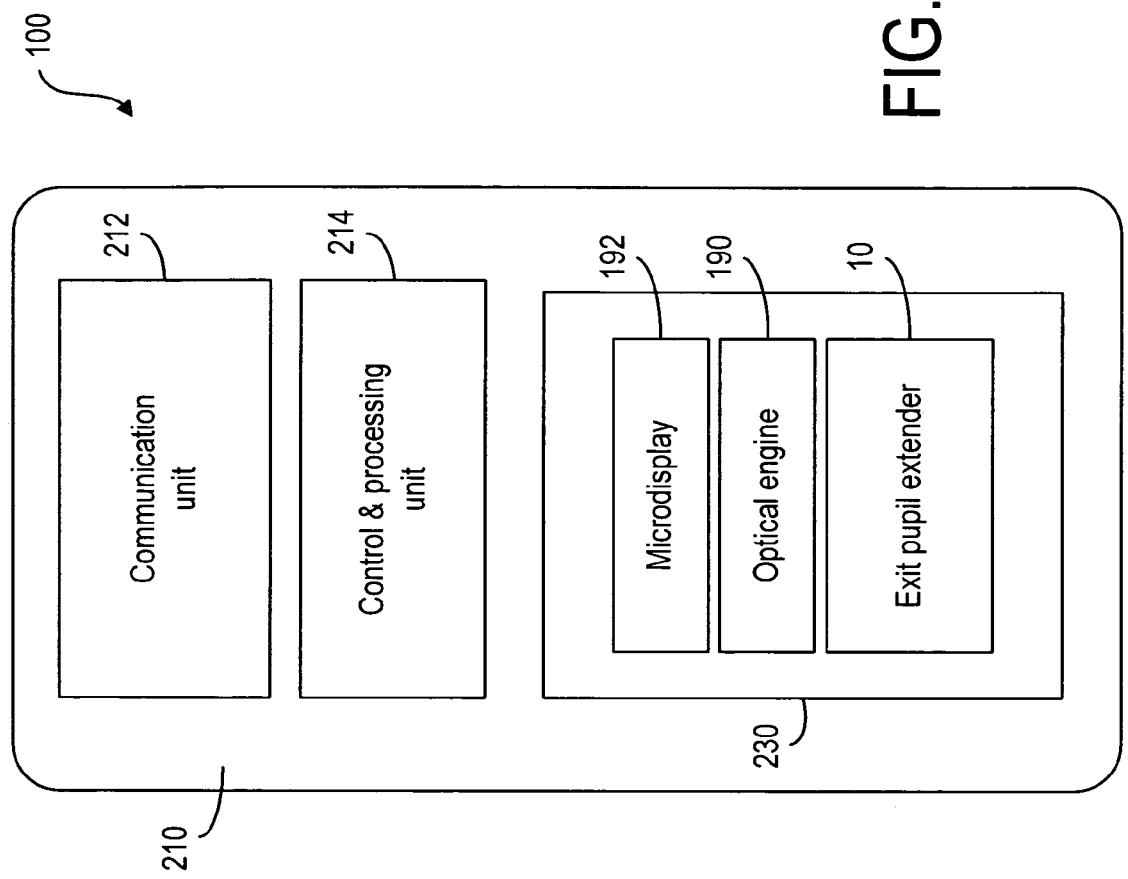
FIG. 5 is a schematic representation showing a mobile device having a virtual display system.
Figure 3D:
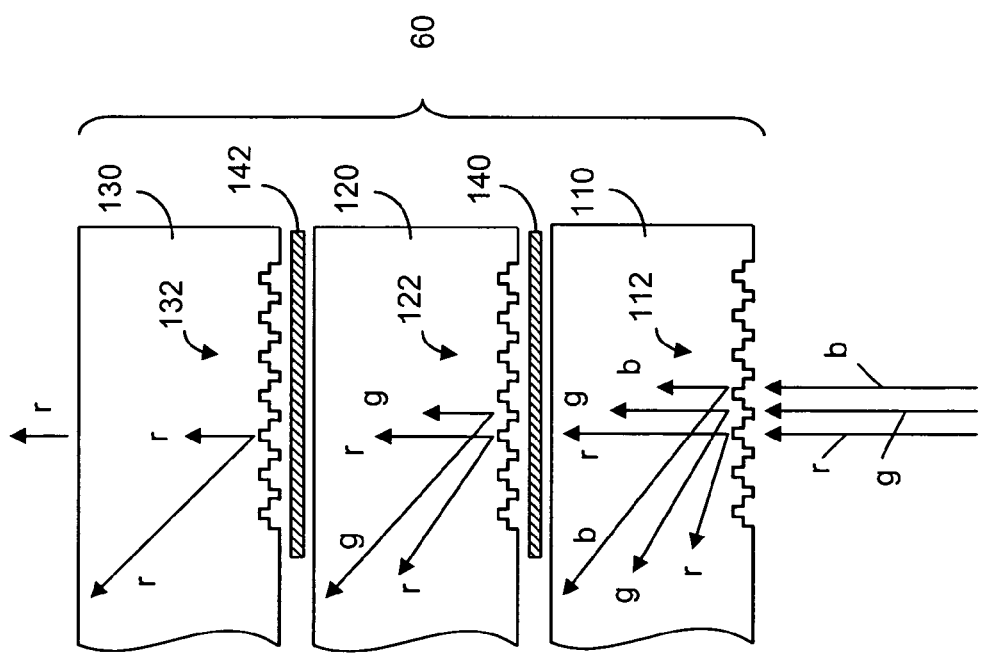
FIG. 3d is a schematic representation showing another embodiment of the exit pupil extender, according to the present invention.

The EPE 10 can be used in a portable device 100, such as a mobile phone, personal digital assistant (PDA), communicator, portable Internet appliance, hand-hand computer, digital video and still camera, wearable computer, computer game device, specialized bring-to-the-eye product for viewing and other portable electronic devices. As shown in FIG. 5, the portable device 100 has a housing 210 to a house a communication unit 212 for receiving and transmitting signals containing information from and to an external device (not shown) if communications are needed. The portable device 100 also has a controlling and processing unit 214 for handling the received and transmitted information, and a virtual display system 230 for viewing. The virtual display system 230 includes a micro-display or image source 192 and an optical engine 190. The controlling and processing unit 214 is operatively connected to an optical engine 190 in order to provide image data to the image source 192 for displaying an image thereon. The EPE 10, according to the present invention, can be optically linked to an optical engine 190 which is used to provide an original image, for example. It should be noted that each of the diffractive elements H1 and H2 could be a holographic optical element (HOE) or a diffractive optical element (DOE). As the name suggests, a holographic optical element is holographically produced where at least two coherent light beams are used to produce interference fringes. In contrast, a diffractive optical element can be mechanically or chemically produced. The EPE 10 can have two or more diffractive elements.

The objective of the present invention is to achieve substantially uniform color distribution among different wavelengths in the exit beam. The application for the EPE of the present invention is not limited to virtual displays. The selective reflection control in a planar waveguide (substrate 60), according to the present invention, can also be used in any application where optical beam expansion in one or more directions is required and light of different wavelengths is used. The diffractive elements (H1, H2) are, in fact, optical couplers and light modulator devices for coupling light into the planar waveguide. Thus, the EPE 10, as shown in FIGS. 3a–3d, can be viewed as an optical device comprised of a planar waveguide and a plurality of optical couplers (or light modulator devices) disposed adjacent to or on the waveguide for light coupling and manipulating purposes.

The image source 192, as depicted in FIG. 5, can be a sequential color LCOS (Liquid Crystal On Silicon) device, an OLED (Organic Light Emitting Diode) array, a MEMS (MicroElectro Mechanical System) device or any other suitable micro-display device operating in transmission, reflection or emission.

Thus, although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. An optical device comprising:
    an exit surface section;
    an input surface section to admit a light beam, the light beam comprising at least a first wavelength component and a second wavelength component; and
    at least a first layer and a second layer, each of the first and second layers comprising a first diffractive element and a second diffractive element, such that
    at least a part of the admitted light beam is diffracted in the first diffractive element in the first layer for providing a first diffracted portion;
    at least a part of the admitted light beam is diffracted in the first diffractive element in the second layer for providing a second diffracted portion;
    at least a part of the first diffracted portion is further diffracted in the second diffractive element in the first layer, thereby forming a first part of an exit beam exiting through the exit surface section; and
    at least a part of the second diffracted portion is further diffracted in the second diffractive element in the second layer, thereby forming a second part of the exit beam exiting through the exit surface section.

2. The optical device of claim 1, wherein the amount of the first wavelength component in the first part of the exit beam is greater than the amount of the second wavelength component in the first part of the exit beam, and the amount of the second wavelength component in the second part of the exit beam is greater than the amount of the first wavelength component in the second part of the exit beam.

3. The optical device of claim 1, wherein the admitted light beam further comprises a third wavelength component, said optical device further comprising:
    a third layer comprising a first diffractive element and a second diffractive element, such that
    at least a part of the admitted light beam is diffracted in the first diffractive element in the third layer for providing a third diffracted portion, and
    at least a part of the third diffracted portion is further diffracted in the second diffractive element in the third layer, thereby forming a third part of the exit beam exiting through the exit surface section.

4. The optical device of claim 3, wherein
    the amount of the first wavelength component in the first part of the exit beam is greater than the amount of the second wavelength component in the first part of the exit beam and is also greater than the amount of the third wavelength component in the first part of the exit beam;
    the amount of the second wavelength component in the second part of the exit beam is greater than the amount of the first wavelength component in the second part of the exit beam and is also greater than the amount of the third wavelength component in the second part of the exit beam; and
    the amount of the third wavelength component in the third part of the exit beam is greater than the amount of the first wavelength component in the third part of the exit beam and is also greater than the amount of the second wavelength component in the third part of the exit beam.

5. The optical device of claim 2, further comprising a filter disposed between the first diffractive element in the first layer and the first diffractive element in the second layer so as to reduce the amount of the first wavelength component in the second part of the exit beam.

6. The optical device of claim 4, further comprising a filter disposed between the first diffractive element in the first layer and the first diffractive element in the second layer so as to reduce the amount of the first wavelength component in the second part of the exit beam and the amount of the first wavelength component in the third part of the exit beam.

7. The optical device of claim 6, further comprising another filter disposed between the first diffractive element of the second layer and the first diffractive element of the third layer so as to reduce the amount of the second wavelength component in the second part of the exit beam and the amount of the second wavelength component in the third part of the exit beam.

8. The optical device of claim 6, further comprising another filter disposed between the first diffractive element of the second layer and the first diffractive element of the third layer so as to reduce the amount of the first and second wavelength components in the second part of the exit beam and the amount of the first and second wavelength components in the third part of the exit beam.

9. The optical device of claim 1, wherein at least one of the first and second diffractive elements in the first and second layers is a holographic optical element.

10. The optical device of claim 1, wherein at least one of the first and second diffractive elements in the first and second layers is a diffractive optical element mechanically or chemically produced.

11. The optical device of claim 3, wherein at least one of the first and second diffractive elements in the first, second and third layers is a holographic optical element.

12. The optical device of claim 3, wherein at least one of the first and second diffractive elements in the first, second and third layers is a diffractive optical element mechanically or chemically produced.

13. The optical device of claim 1, wherein the first wavelength component has a first wavelength range and the second wavelength component has a second wavelength range longer than the first wavelength range.

14. The optical device of claim 3, wherein the first wavelength component has a first wavelength range, the second wavelength component has a second wavelength range longer than the first wavelength range, and the third wavelength component has a third wavelength range greater than the second wavelength range.

15. The optical device of claim 3, wherein the first wavelength component comprises a blue color wavelength component, the second wavelength component comprises a green color component and the third wavelength component comprises a red color component.

16. A method of improving color uniformity in an exit beam in an optical device, the optical device having
an input surface section to admit a light beam, the light beam comprising at least a first wavelength component and a second wavelength component; and
an exit surface section for allowing the exit beam to exit the optical device through the exit surface, said method comprising:
providing at least a first layer and second layer in the optical device;
providing a first diffractive element and a second diffractive element on the first layer;
providing a first diffractive element and a second diffractive element on the second layer, such that
at least a part of the admitted light beam is diffracted in the first diffractive element in the first layer for providing a first diffracted portion;
at least a part of the admitted light beam is diffracted in the first diffractive element in the second layer for providing a second diffracted portion;
at least a part of the first diffracted portion is further diffracted in the second diffractive element in the first layer, thereby forming a first part of an exit beam exiting through the exit surface section; and
at least a part of the second diffracted portion is further diffracted in the second diffractive element in the second layer, thereby forming a second part of the exit beam exiting through the exit surface section, wherein
the amount of the first wavelength component in the first part of the exit beam is greater than the amount of the second wavelength component in the first part of the exit beam, and
the amount of the second wavelength component in the second part of the exit beam is greater than the amount of the first wavelength component in the second part of the exit beam.

17. The method of claim 16, further comprising:
disposing a filter between the first diffractive element in the first layer and the first diffractive element in the second layer so as to reduce the amount of the first wavelength component in the second part of the exit beam.

18. The method of claim 16, further comprising
providing a third layer adjacent the second layer in the optical device;

providing a first diffractive element and a second diffractive element in the third layer, such that
at least a part of the admitted light beam is also diffracted in the first diffractive element in the third layer for providing a third diffracted portion, and
at least a part of the third diffracted portion is further diffracted in the second diffractive element in the third layer, thereby forming a third part of the exit beam exiting through the exit surface section, wherein
the amount of the first wavelength component in the first part of the exit beam is greater than the amount of the second wavelength component in the first part of the exit beam and is also greater than the amount of the third wavelength component in the first part of the exit beam;
the amount of the second wavelength component in the second part of the exit beam is greater than the amount of the first wavelength component in the second part of the exit beam and is also greater than the amount of the third wavelength component in the second part of the exit beam; and
the amount of the third wavelength component in the third part of the exit beam is greater than the amount of the first wavelength component in the third part of the exit beam and is also greater than the amount of the second wavelength component in the third part of the exit beam.

19. The method of claim 18, further comprising
disposing a filter between the first diffractive element in the first layer and the first diffractive element in the second layer so as to reduce the amount of the first wavelength component in the second part of the exit beam and the amount of the first wavelength component in the third part of the exit beam.

20. The method of claim 19, further comprising
disposing another filter between the first diffractive element of the second layer and the first diffractive element of the third layer so as to reduce the amount of the second wavelength component in the second part of the exit beam and the amount of the second wavelength component in the third part of the exit beam.

21. A display module, comprising:
an optical engine for receiving image data;
a display device operatively connected to the optical engine for forming an image based on the image data; and
an exit pupil extender, comprising:
an exit surface section;
an input surface section to admit a light beam, the light beam comprising at least a first wavelength component and a second wavelength component; and
at least a first layer, a second layer and a third layer, each of the first, second and third layers comprises a first diffractive element and a second diffractive element, such that
at least a part of the admitted light beam is diffracted in the first diffractive element in the first layer for providing a first diffracted portion;
at least a part of the admitted light beam is diffracted in the first diffractive element in the second layer for providing a second diffracted portion;
at least a part of the admitted light beam is diffracted in the first diffractive element in the third layer for providing a third diffracted portion;
at least a part of the first diffracted portion is further diffracted in the second diffractive element in the first layer, thereby forming a first part of an exit beam exiting through the exit surface section;

at least a part of the second diffracted portion is further diffracted in the second diffractive element in the second layer, thereby forming a second part of the exit beam exiting through the exit surface section; and at least a part of the third diffractive portion is further diffracted in the third diffractive element in the third layer, thereby forming a third part of the exit beam exiting through the exit surface section.

22. The display module of claim 21, wherein the amount of the first wavelength component in the first part of the exit beam is greater than the amount of the second wavelength component in the first part of the exit beam and is also greater than the amount of the third wavelength component in the first part of the exit beam;

the amount of the second wavelength component in the second part of the exit beam is greater than the amount of the first wavelength component in the second part of the exit beam and is also greater than the amount of the third wavelength component in the second part of the exit beam; and the amount of the third wavelength component in the third part of the exit beam is greater than the amount of the first wavelength component in the third part of the exit beam and is also greater than the amount of the second wavelength component in the third part of the exit beam.

23. An electronic device comprising:

a data processing unit;

an optical engine operatively connected to the data processing unit for receiving image data from the data processing unit;

a display device operatively connected to the optical engine for forming an image based on the image data; and an exit pupil extender, comprising:

an exit surface section;

an input surface section to admit a light beam, the light beam comprising at least a first wavelength component and a second wavelength component; and at least a first layer, a second layer and a third layer, each of the first, second and third layers comprising a first diffractive element and a second diffractive element, such that at least a part of the admitted light beam is diffracted in the first diffractive element in the first layer for providing a first diffracted portion;

at least a part of the admitted light beam is diffracted in the first diffractive element in the second layer for providing a second diffracted portion;

at least a part of the admitted light beam is diffracted in the first diffractive element in the third layer for providing a third diffracted portion;

at least a part of the first diffracted portion is further diffracted in the second diffractive element in the first layer, thereby forming a first part of an exit beam exiting through the exit surface section;

at least a part of the second diffracted portion is further diffracted in the second diffractive element in the second layer, thereby forming a second part of the exit beam exiting through the exit surface section; and at least a part of the third diffractive portion is further diffracted in the third diffractive element in the third layer, thereby forming a third part of the exit beam exiting through the exit surface section.

24. The electronic device of claim 23, wherein the amount of the first wavelength component in the first part of the exit beam is greater than the amount of the second wavelength component in the first part of the exit beam and is also greater than the amount of the third wavelength component in the first part of the exit beam;

the amount of the second wavelength component in the second part of the exit beam is greater than the amount of the first wavelength component in the second part of the exit beam and is also greater than the amount of the third wavelength component in the second part of the exit beam; and the amount of the third wavelength component in the third part of the exit beam is greater than the amount of the first wavelength component in the third part of the exit beam and is also greater than the amount of the second wavelength component in the third part of the exit beam.

25. The electronic device of claim 24, comprising a computer game device.

26. The electronic device of claim 24, comprising a digital camera.

27. The electronic device of claim 24, further comprising a communication unit for receiving signals containing information indicative to the image data, wherein the data processing unit is operatively connected to the communication unit for receiving the information.

28. The electronic device of claim 27, comprising a mobile terminal.

* * * * *